United States Patent [19]

Kawahara et al.

[11] Patent Number: 5,315,408
[45] Date of Patent: May 24, 1994

[54] IMAGE SIGNAL GENERATING APPARATUS

[75] Inventors: Norihiro Kawahara, Tokyo; Yoshihiro Nakatani, Yokohama, both of Japan

[73] Assignee: Canon Kabushiki Kaisha, Tokyo, Japan

[21] Appl. No.: 797,962

[22] Filed: Nov. 26, 1991

[30] Foreign Application Priority Data

Nov. 30, 1990 [JP] Japan .................. 2-329743

[51] Int. Cl.$^5$ .............................. H04N 1/40
[52] U.S. Cl. .................. 358/458; 358/455; 358/444; 358/445; 348/390
[58] Field of Search ............ 358/458, 456, 455, 448, 358/444, 404, 403, 447, 445, 138, 133, 134, 141, 12

[56] References Cited

U.S. PATENT DOCUMENTS

| | | |
|---|---|---|
| 4,349,844 | 9/1982 | Kouno et al. .................. 358/456 |
| 4,733,230 | 3/1988 | Kurihara et al. .................. 358/456 |
| 4,782,387 | 11/1988 | Sabri et al. .................. 358/133 |
| 4,823,194 | 4/1989 | Mishima et al. .................. 358/455 |
| 4,918,541 | 4/1990 | Ishida et al. .................. 358/467 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

An image singal generating apparatus of the invention is an apparatus for generating an image signal. Quantized data is formed by quantizing the input image signal. The formed quantized data is sequentially distributed and supplied to a plurality of holding means each of which can hold the quantized data of one picture image. The quantized data held in each of the plurality of holding means is selectively sequentially generated. The quantized image signal is formed on the basis of the generated quantized data. Thus, the superfine quantized image signal can be generated.

19 Claims, 5 Drawing Sheets

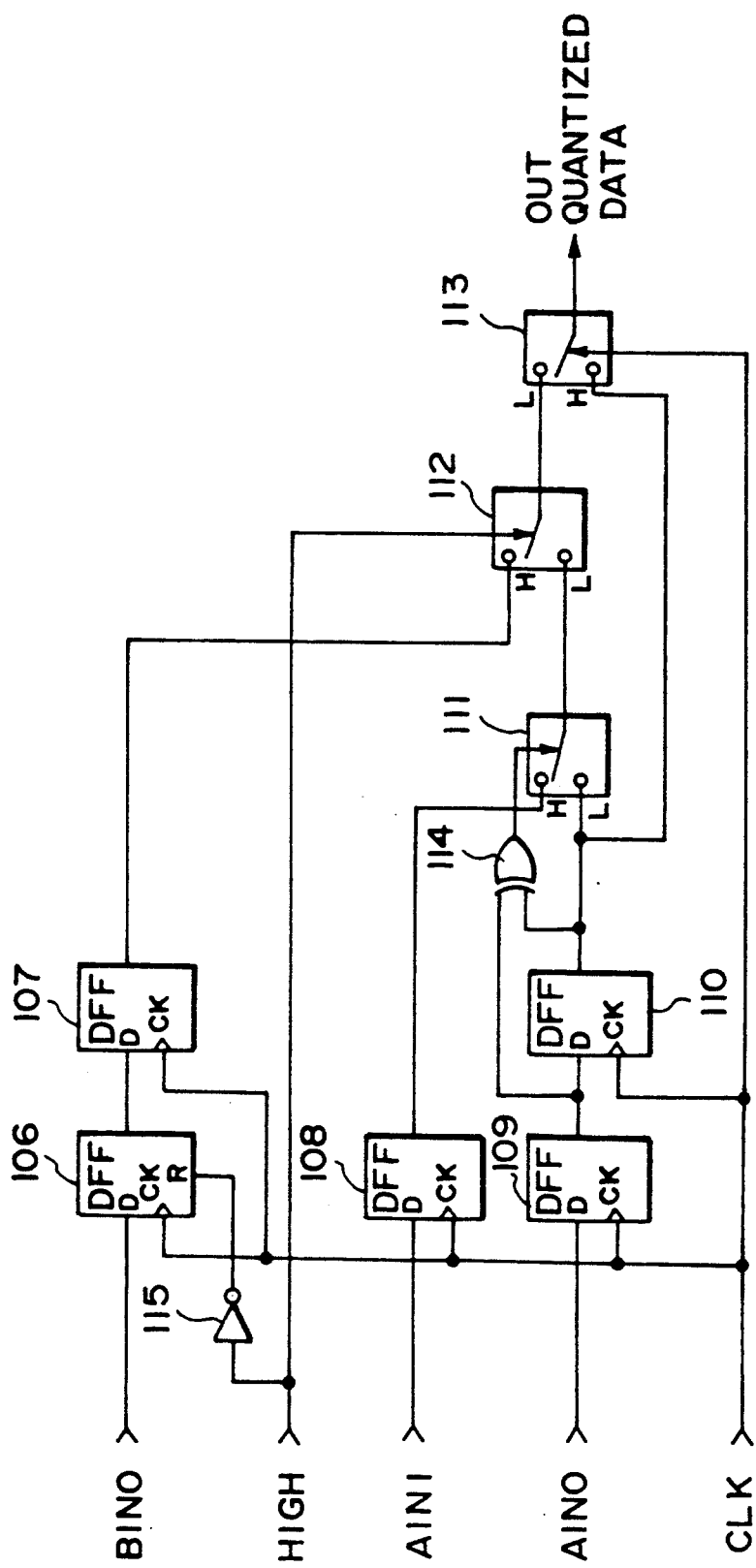
F I G. 3

O X O X O        A B A B A
X O X O X        B A B A B
O X O X O        A B A B A
F I G. 4A        F I G. 4B
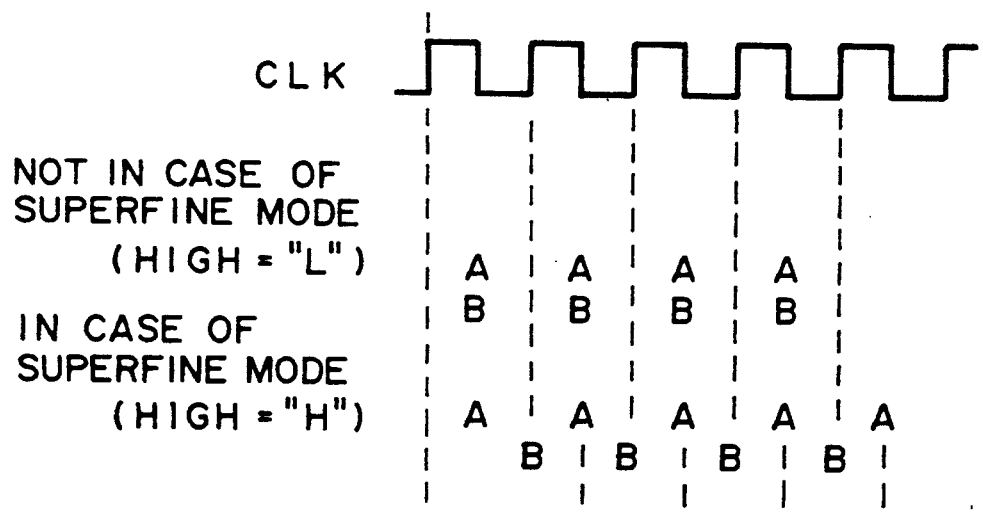
F I G. 6

IMAGE SIGNAL GENERATING APPARATUS

BACKGROUND OF THE INVENTION

1. Field of the Invention

The invention relates to an image signal generating apparatus for generating an image signal.

2. Description of the Related Background Art

Hitherto, to display quantized image data, it is once stored into a memory, and when the image data stored in the memory is read out and displayed, the image data compressed by, for instance, a line offset is stored into the memory, and when the image data is read out of the memory, it is expanded by executing an interpolating process and is displayed.

FIG. 1 is an explanatory diagram for explaining the above interpolating process.

It is now assumed that the interpolating process of image data b which has been thinned out by the line offset is performed. Image data a and c existing on both sides of the image data b are compared. When the image data a and c are equal, the portion where the image data b is located is interpolated by the image data a. When the image data a and c are different, the portion where the image data b is located is interpolated by image data d locating on the line just over the line on which the image data b is located. That is, the image data b is determined by decision by majority of the image data a, c, and d.

In the conventional example, however, for instance, the image data is determined by interpolating the image data b by the logic of the decision by majority from the image data a, c, and d compressed by the line offset and is reconstructed. Therefore, in the case where the image data is expanded as mentioned above, the correct image data cannot always be reconstructed by the interpolation, so that there is a case where a request for the superfine image display cannot be satisfied.

SUMMARY OF THE INVENTION

It is an object of the invention to provide an image signal generating apparatus which can solve the above problems.

Another object of the invention is to provide an image signal generating apparatus which can generate a superfine quantized image signal.

Under the above objects, according to the invention, as one embodiment, there is provided an image signal generating apparatus for generating an image signal, comprising: quantized data forming means for receiving an image signal, for quantizing the input image signal, and for forming quantized data; a plurality of quantized data holding means each of which can hold the quantized data of one picture image; quantized data input-/output control means for sequentially distributing and supplying the quantized data formed by the quantized data forming means to the plurality of quantized data holding means and for selectively sequentially generating the quantized data held in the plurality of quantized data holding means; and quantized image signal forming means for forming a quantized image signal on the basis of the quantized data which are generated from the plurality of quantized data holding means.

Still another object of the invention is to provide an image signal generating apparatus which can generate a superfine binary image signal.

Under the above obeject, according to the invention, as one embodiment, there is provided an image signal generating apparatus for generating an image signal, comprising: binary image data forming means for receiving an image signal, for binarizing the input image signal, and for forming binary image data; a plurality of binary image data memory means each of which can store the binary image data of one picture image; binary image data writing/reading control means for sequentially distributing and writing the binary image data formed by the binary image data forming means into the plurality of binary image data memory means and for selectively sequentially reading out the binary image data written in the plurality of binary image data memory means; and binary image signal forming means for forming a binary image signal on the basis of the binary image data which are read out of the plurality of binary image data memory means.

Further another object of the invention is to provide an image signal generating apparatus which can selectively generate a superfine quantized image signal and a low fine quantized image signal.

Under the above object, according to the invention, as one embodiment, there is provided an image signal generating apparatus for generating an image signal, comprising: quantized data forming means for receiving an image signal, for quantizing the input image signal, and for forming quantized data; N (N is an integer of $N \geq 2$) quantized data holding means each of which can hold the quantized data of one picture image; quantized data input/output control means which has a first quantized data output mode for sequentially distributing and supplying the quantized data formed by the quantized data forming means into the N quantized data holding means and for selectively sequentially outputting the quantized data held in the N quantized data holding means and a second quantized data output mode for selectively sequentially outputting the quantized data held in the M (M is an integer of $1 \leq M < N$) quantized data holding means among the N quantized data holding means and which generates the quantized data held in the N quantized data holding means in accordance with either one of the first and second quantized data output modes; and quantized image signal forming means for forming a quantized image signal on the basis of the quantized data which are generated from the N quantized data holding means.

Still another object of the invention is to provide an image signal generating apparatus which can selectively generate a superfine binary image signal and a low fine binary image signal.

Under the above object, according to the invention, as one embodiment, there is provided an image signal generating apparatus for generating an image signal, comprising: binary image data forming means for receiving an image signal, for binarizing the input image signal, and for forming binary image data; N (N is an integer of $N \geq 2$) binary image data memory means each of which can store the binary image data of one picture image; binary image data writing/reading control means which has a first binary image data reading mode for sequentially distributing and writing the binary image data formed by the binary image data forming means into the N binary image data memory means and for selectively sequentially reading out the binary image data written in the N binary image data memory means and a second binary image data reading mode for selectively sequentially reading out the binary image data written in the M (M is an integer of $1 \leq M < N$) binary image data memory means among the N binary image data memory means and which reads out the binary image data written in the N binary image data memory means in accordance with either one of the first and second binary image data reading modes; and binary image signal forming means for forming a binary image signal on the basis of the binary image data which are read out of the N binary image data memory means.

The above and other objects and features of the present invention will become apparent from the following detailed description and the appended claims with reference to the accompanying drawings.

BRIEF DESCRIPTION OF THE DRAWINGS

FIG. 3 is a diagram showing a construction of a circuit for switching a mode to display image data of two picture images as a superfine image of one picture image and a mode to execute an interpolating process to only image data of one picture image and to display the interpolated image data;

FIGS. 4A and 4B are diagrams showing a display example in the case where image data of two picture images is displayed as a superfine image of one picture image and a display example in the case where only image data of one picture image is subjected to the interpolating process and the interpolated image is displayed;

FIG. 6 is a diagram showing the correspondence between a clock CLK in FIG. 5 and a picture image which is written into the memory 4 in FIG. 2;

DETAILED DESCRIPTION OF THE PREFERRED EMBODIMENTS

An embodiment of the invention will be described in detail hereinbelow with reference to the drawings.

Figures 1, 2:
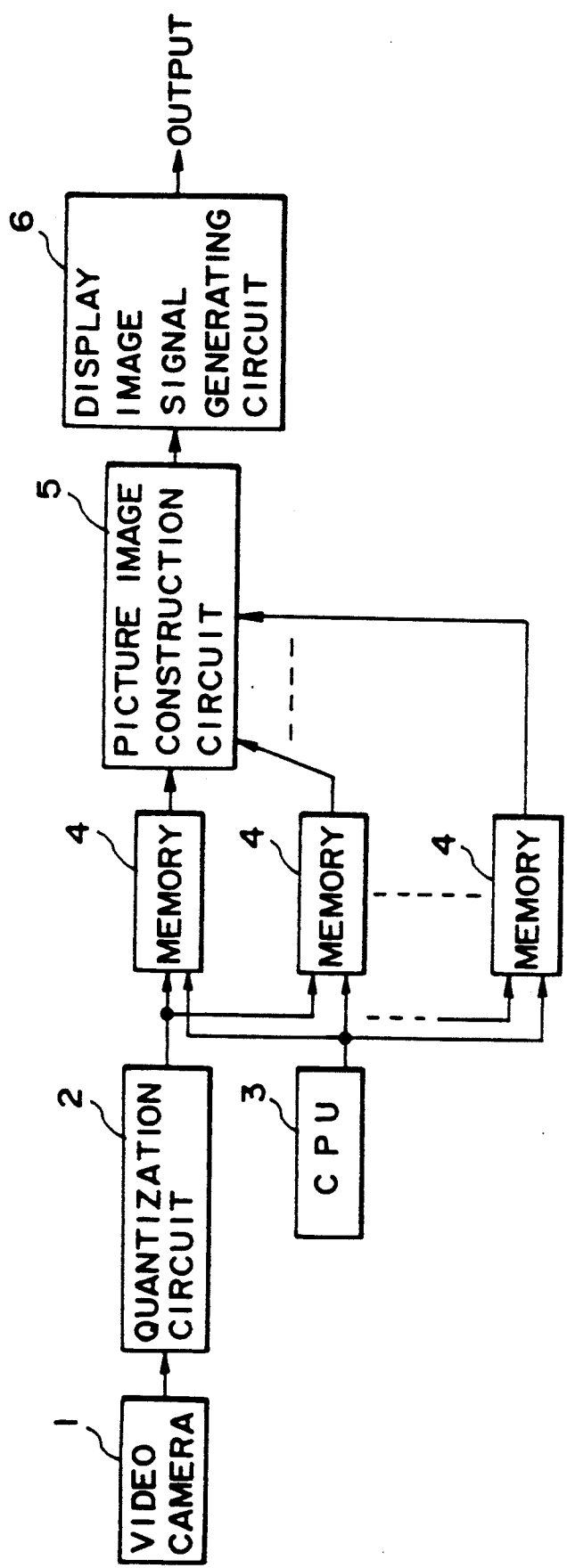
FIG. 1 is an explanatory diagram for explaining an interpolating process.
FIG. 2 is a block diagram showing a construction of an embodiment of the invention.

FIG. 2 is a diagram showing a construction of an embodiment of the invention. In FIG. 2, reference numeral 1 denotes a video camera; 2 a quantization circuit to quantize an image signal of one picture image from the video camera 1; 3 a CPU (Central processing Unit) for sequentially distributing and writing the quantized data obtained by quantizing by the quantization circuit 2 into a plurality of memories 4 and for sequentially reading out the quantized data from the memories 4; 5 a picture image construction circuit to construct one picture image from the quantized data which have been read out of the memories 4; and 6 a display image signal generating circuit to generate a display image signal on the basis of the quantized data which has been picture image constructed by the picture image construction circuit 5.

The operation will now be described.

The image signal of one picture image from the video camera 1 is quantized by the quantization circuit 2. The quantized data obtained by quantizing by the quantization circuit 2 are sequentially distributed and written into a plurality of memories 4. One picture image is constructed by the picture image construction circuit 5 from the quantized data which have sequentially been read out of the memories 4. On the basis of the quantized data constructed to one picture image, a display image signal is generated from the display image signal generating circuit 6.

FIG. 3 shows a construction of a circuit to switch either a mode for alternately reading out the quantized data of two picture images in the picutre image construction circuit 5 every picture image of one side and for displaying as a superfine image of one picture image or a mode for expanding the quantized data of only the picture image of one side compressed by the line offset by executing the interpolating process and for displaying the expanded quantized data.

In FIG. 3, AIN0 denotes quantized data of an arbitrary line of a picture image A which is generated from the memories 4 in FIG. 2; AIN1 indicates quantized data in which the quantized data AIN0 has been delayed by the time corresponding to one line by, for instance, a line memory or the like; HIGH a control signal which is set to the high "H" level in the suerfine mode; BIN0 the quantized data of a picture image B which is generated from the memories 4 in FIG. 2 and corresponds to the same line as that of the quantized data AIN0; and CLK a clock.

Reference numeral 106 denotes a D flip-flop (hereinafter, abbreviated to DFF) in which the quantized data of the picture image B is supplied to a D terminal, the clock CLK is supplied to a clock terminal CK, and the control signal HIGH inverted by an inverter 115 is supplied to a reset terminal R. Reference numeral 107 denotes a DFF in which an output of the DFF 106 is supplied to a D terminal and the clock CLK is supplied to a clock terminal CK.

Reference numeral 108 denotes a DFF in which the data AIN1 is supplied to a D terminal and the clock CLK is supplied to a clock terminal CK. Reference numeral 109 denotes a DFF in which the data AIN0 is supplied to a D terminal and the clock CLK is supplied to a clock terminal CK. Reference numeral 110 denotes a DFF in which an output of the DFF 109 is supplied to a D terminal and the clock CLK is supplied to a clock terminal CK. Reference numeral 114 denotes an EXOR gate to calculate the EXOR from the outputs of the DFFs 109 and 110.

Reference numeral 111 denotes a selector for selecting and outputting either one of the outputs of the DFFs 108 and 110 in accordance with the output level of the EXOR gate 114; 112 a selector for selecting and outputting either one of the output of the DFF 107 and an output of the selector 111 in accordance with the level of the control signal HIGH: and 113 a selector for selecting and outputting either one of an output of the selector 112 and the output of the DFF 110 on the basis of the level of the clock CLK.

The operation will now be described.

The operation in the case where the mode is not the superfine mode, that is, the case where the quantized data compressed by the line offset is expanded by the interpolating process and the quantized data of one picture image is displayed as an image of one picture image will be first explained.

In the case where the mode is not the superfine mode, the control signal HIGH is at the low "L" level, so that the DFF 106 with the reset terminal is reset, the output of the DFF 106 is set to the "L" level, and this case is equivalent to a state in which the quantized data of the picture image B is not read out of the memory 4 in FIG. 2. On the other hand, since the control signal HIGH which is supplied to the selector 112 is always at the "L" level, the quantized data of the picture image A (namely, the quantized data supplied to an "L" terminal side in the diagram) is always selected. The outputs of the DFFs 109 and 110 respectively correspond to the image data c and a shown in FIG. 1. The outputs of the DFFs 109 and 110 are compared by the EXOR gate 114. When the outputs of the DFFs 109 and 110 are equal, an output of the EXOR gate 114 is set to the "L" level. When the outputs of the DFFs 109 and 110 are different, the output of the EXOR gate 114 is set to the "H" level. The output of the EXOR gate 114 is a control signal of the selector 111. When the output of the EXOR gate 114 is at the "L" level, the output of the DFF 110 (namely, the quantized data supplied to an "L" terminal in the diagram) is selected. When the output of the EXOR gate 114 is at the "H" level, the output of the DFF 108 (namely, the quantized data supplied to an "H" terminal in the diagram) is selected. The outputs of the DFFs 110 and 108 respectively correspond to the image data a and d in FIG. 1. The output of the selector 111 corresponds to the image data b in FIG. 1, that is, the interpolated image data. As mentioned above, when the mode is not the superfine mode, since the output of the selector 112 is always the same as the output of the selector 111, the output of the selector 112 corresponding to the image data b in FIG. 1 and the output of the DFF 110 corresponding to the image data a in FIG. 1 are supplied to the selector 113. At this time, when the clock CLK is at the "H" level, the output of the DFF 110 (namely, the quantized data supplied to an "H" terminal in the diagram) is selected. When the clock CLK is at the "L" level, the output of the selector 112 (that is, the quantized data supplied to an "L" terminal in the diagram) is selected. Due to this, two quantized data per period of the clock CLK are generated from the selector 113 and it is equivalent to that the quantized data of the amount which is twice as large as the quantized data written in the memories 4 in FIG. 2 is read out. FIG. 4A shows a display example of the quantized data which has been interpolated and supplied from the selector 113 as mentioned above. In the diagram, o denotes pixels in which the quantized data written in the memories 4 in FIG. 2 are displayed as they are and x indicates pixels in which the interpolated quantized data formed by the interpolating process are displayed.

The operation in the superfine mode will now be described.

In the superfine mode, since the control signal HIGH is set to the "H" level, the DFF 106 is not reset. In addition, since the control signal HIGH which is supplied to the selector 112 is always at the "H" level, the output of the DFF 107 (namely, the quantized data supplied to an "H" terminal side in the diagram) is selected. The quantized data of the picture image B is selected in place of the interpolated quantized data of the picture image A. Therefore, the output of the selector 112 is the same as the output of the DFF 107. The clock CLK is used as a control signal of the selector 113. When the clock CLK is at the "H" level, the quantized data of the picture image A, namely, the output of the DFF 110 is selected. When the clock CLK is at the "L" level, the quantized data of the picture image B, that is, the output of the selector 112 is selected. As shown in FIG. 4B, the quantized data (pixels shown by A in the diagram) of the picture image A and the quantized data (pixels shown by B in the diagram) of the picture image B are alternately displayed every other pixels.

Figure 5:
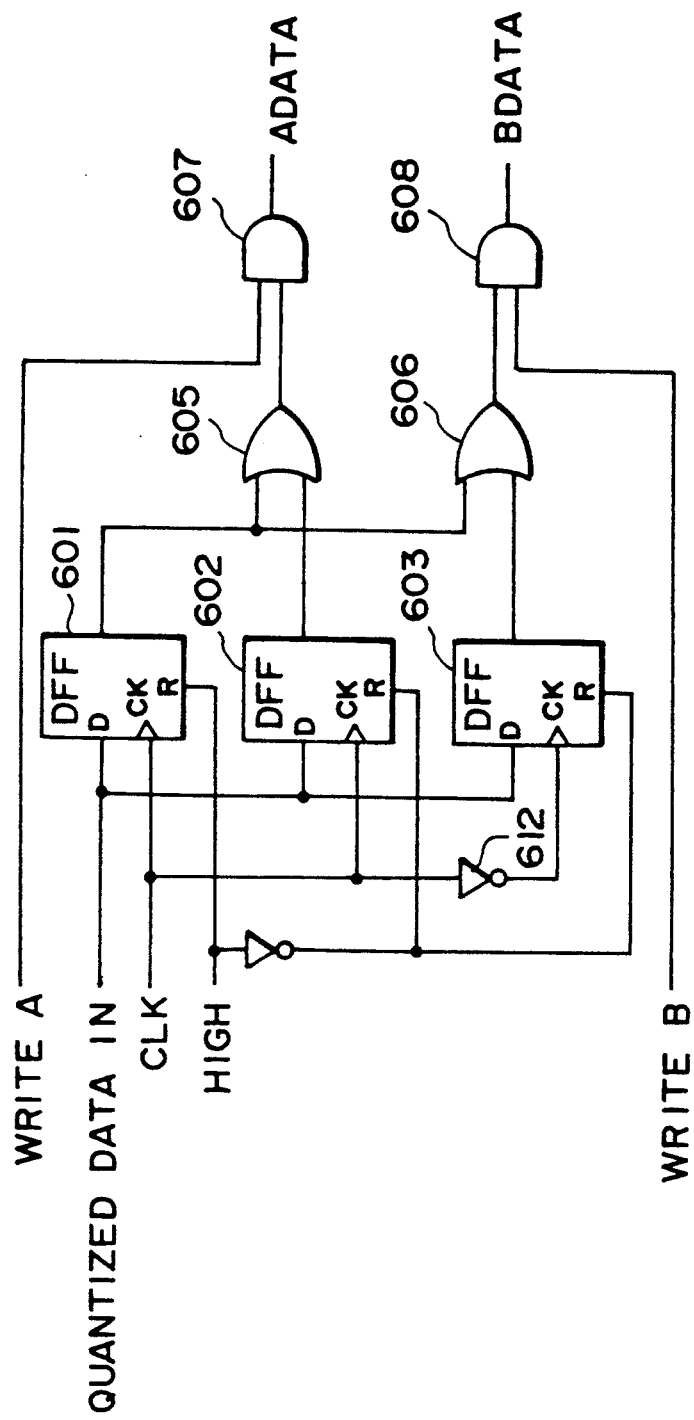
FIG. 5 is a diagram showing a construction of a writing circuit to execute the operation to write image data into a memory 4 in FIG. 2.

The operation to write the quantized data into the memories 4 in FIG. 2 will now be described with reference to FIG. 5.

First, in the mode other than the superfine mode, the control signal HIGH is at the "L" level, so that DFFs 602 and 603 are reset and only a DFF 601 operates. An output of the DFF 601 passes through OR gates 605 and 606 and is supplied to AND gates 607 and 608, respectively. When the quantized data of the picture image A is written into the memories 4, a signal WRITEA is set to the "H" level. When the quantized data of the picture image B is written into the memories 4, a signal WRITEB is set to the "H" level. Quantized data ADATA and BDATA are written into the different memories 4 corresponding to the picture images A and B, respectively.

In the superfine mode, since the control signal HIGH is at the "H" level, the DFF 601 is reset and both of the signals WRITEA and WRITEB are set to the "H" level. Since the phase of the clock CLK which is supplied to the DFFs 602 and 603 is inverted by an inverter 612, as shown in FIG. 6, the quantized data are distributed and supplied every other pixels into the different memories 4 corresponding to the picture images A and B and are written. That is, in the superfine mode, the quantized data which has been thinned out in the mode other than the superfine mode is written into the memory 4 corresponding to another picture image.

In the embodiment, in the superfine mode, the quantized data which has been thinned out in the mode other than the superfine mode is written into the memory corresponding to the other picture image as mentioned above. When the quantized data is read out of the memories, the interpolating process is not performed but the quantized data corresponding to the picture images are sequentially switched and read out, so that the superfine quantized image without a picture quality deterioration by the interpolating process is obtained.

Figure 7:
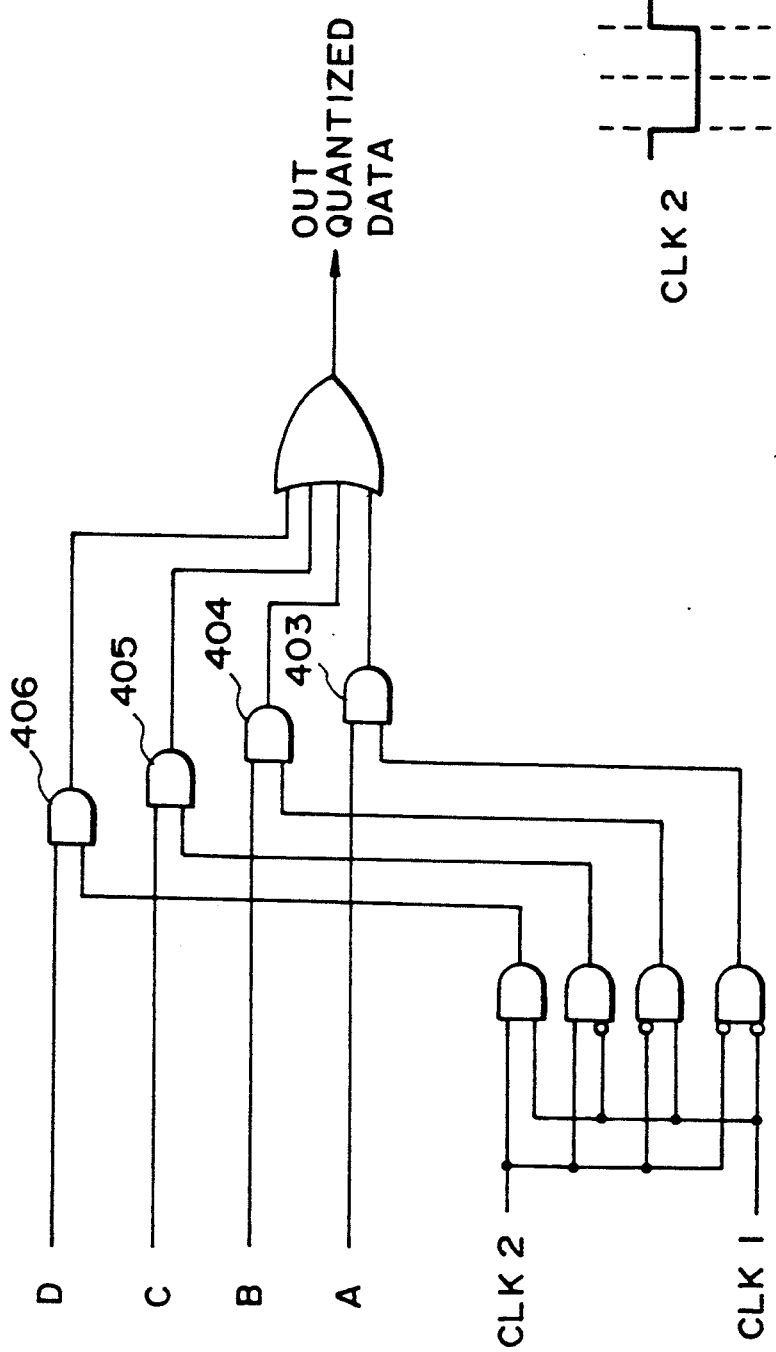
FIG. 7 is a diagram showing a construction of a circuit to output image data of four picture images as a superfine image of one picture image.

FIG. 7 shows a construction of a circuit for sequentially switching the quantized data of four picture images, for reading out of the memory 4 corresponding to each picture image, and for generating as a superfine image of one picture image.

Figure 8:
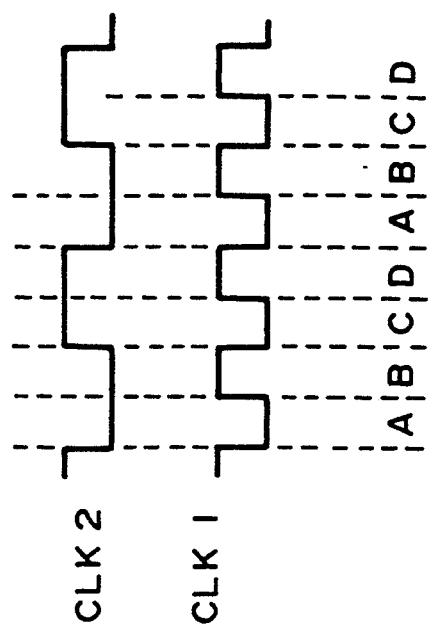
FIG. 8 is a diagram showing the correspondence of the selection between the clocks CLK in FIG. 7 and the picture image written in the memory 4 in FIG. 2.

In FIG. 7, a clock CLK1 is obtained by frequency dividing a clock CLK2. The clock CLK2 is used in the writing mode. Opening and closing operations of AND gates 403 to 406 are controlled in a manner such that the quantized data of the picture image A is generated when both of the clocks CLK1 and CLK2 are at the "L" level, the quantized data of the picture image B is generated when the CLK 1 is at the "H" level and the CLK2 is at the "L" level, the quantized data of the picture image C is generated when the CLK1 is at the "L" level and the CLK2 is at the "H" level, and the quantized data of the picture image D is generated when both of the CLK1 and CLK2 are at the "H" level, respectively. FIG. 8 shows the correspondence between the clocks CLK1 and CLK2 and the picture image which is selected.

On the other hand, by providing the interpolation processing circuit shown in FIG. 3 for the circuit shown in FIG. 7, it is possible to switch the superfine mode and the mode other than the superfine mode.

As described above, according to the embodiments, the quantized data of a desired number of picture images are respectively distributed and written into the memories corresponding to a plurality of picture images, and when they are used out, the quantized data are sequentially switched and are read out of the memories corresponding to the picture images and are generated as quantized data of a desired number of picture images. Thus, a superfine quantized image without a picture quality deterioration can be obtained.

What is claimed is:

1. An image signal generating apparatus for generating an image signal, comprising:
    (A) quantized data forming means for receiving an image signal, for quantizing the input image signal, and for forming quantized data;
    (B) a plurality of quantized data holding means each of which can hold the quantized data of one picture image;
    (C) quantized data input/output control means for sequentially distributing and supplying the quantized data formed by the quantized data forming means into said plurality of quantized data holding means and for selectively sequentially generating the quantized data held in said plurality of quantized data holding means; and
    (D) quantized image signal forming means for forming a quantized image signal on the basis of the quantized data which are generated from said plurality of quantized data holding means.

2. An apparatus according to claim 1, further having image pickup means for picking up an image of an object, for generating an image signal corresponding to the picked-up object image, and for supplying to the quantized data forming means.

3. An apparatus according to claim 1, wherein the quantized data forming means is arranged so as to form the quantized data corresponding to the image signal indicative of a gradation lower than a gradation shown by the input image signal from the input image signal.

4. An apparatus according to claim 1, further having display means for displaying an image corresponding to the quantized image signal which is formed by the quantized image signal forming means.

5. An apparatus according to claim 1, wherein the quantized data input/output control means is arranged so as to sequentially distribute and supply the quantized data formed by the quantized data forming means into said plurality of quantized data holding means at different timings and to selectively sequentially switch and generate the quantized data held in said plurality of quantized data holding means, respectively.

6. An image signal generating apparatus for generating an image signal, comprising:
    (A) binary image date forming means for receiving an image signal, for binarizing the received image signal to form binary image data;
    (B) a plurality of binary image data memory means each of which can store the binary image data of one picture image;
    (C) binary image data writing/reading control means for sequentially distributing and writing the binary image data formed by the binary image data forming means into said plurality of binary image data memory means at different timings and selectively sequentially switching and reading out the binary image data written in said plurality of binary image data memory means, respectively; and
    (D) binary image signal forming means for forming a binary image signal on the basis of the binary image data which are read out of said plurality of binary image data memory means.

7. An apparatus according to claim 6, further having image pickup means for picking up an image of an object, for generating an image signal corresponding to the picked-up object image, and for supplying to the binary image data forming means.

8. An apparatus according to claim 6, further having display means for displaying an image corresponding to the binary image signal which is formed by the binary image signal forming means.

9. An image signal generating apparatus for generating an image signal, comprising:
    (A) quantized data forming means for receiving an image signal, for quantizing the input image signal, and for forming quantized data;
    (B) N (N is an integer of $N \geq 2$) quantized data holding means each of which can hold the quantized data of one picture image;
    (C) quantized data input/output control means which has a first quantized data outputting mode for sequentially distributing and supplying the quantized data formed by the quantized data forming means into said N quantized data holding means and for selectively sequentially generating the quantized data held in the N quantized data holding means and a second quantized data outputting mode for selectively sequentially generating the quantized data held in the M (M is an integer of $1 \leq M < N$) quantized data holding means among the N quantized data holding means, respectively, and which allows the quantized data held in the N quantized data holding means to be generated in accordance with either one of the first and second quantized data outputting modes; and
    (D) quantized image signal forming means for forming a quantized image signal on the basis of the quantized data which are generated from the N quantized data holding means.

10. An apparatus according to claim 9, further having image pickup means for picking up an image of an object, for generating an image signal corresponding to the picked-up object image, and for supplying to the quantized data forming means.

11. An apparatus according to claim 9, wherein the quantized data forming means is arranged so as to form the quantized data corresponding to an image signal indicative of a gradation lower than a gradation shown by the input image signal from the input image signal.

12. An apparatus according to claim 9, further having display means for displaying an image corresponding to the quantized image signal formed by the quantized image signal forming means.

13. An apparatus according to claim 9, wherein the quantized data input/output control means has a first quantized data outputting mode for sequentially distributing and supplying the quantized data formed by the quantized data forming means into the N quantized data holding means at different timings and for selectively sequentially switching and generating the quantized data held in the N quantized data holding means, respectively, and a second quantized data outputting mode for selectively sequentially switching and generating the quantized data held in the M quantized data holding means among the N quantized data holding means, respectively, and is arranged so as to allow the quantized data held in the N quantized data holding means to be generated in accordance with either one of the first and second quantized data outputting modes.

14. An apparatus according to claim 9, wherein the quantized image signal forming means includes interpolation processing means for executing an interpolating process to the quantized data which are generated from the M quantized data holding means in the case where the quantized data respectively held in the M quantized data holding means are selectively sequentially generated in accordance with the second quantized data outputting mode by the quantized data input/output control means.

15. An image signal generating apparatus for generating an image signal, comprising:
  (A) binary image data forming means for receiving an image signal, for binarizing the input image singal, and for forming binary image data;
  (B) N (N is an integer of N≧2) binary image data memory means each of which can store the binary image data of one picture image;
  (C) binary image data writing/reading control means which has a first binary image data reading mode for sequentially distributing and writing the binary image data formed by the binary image data forming means into the N binary image data memory means and for selectively sequentially reading out the binary image data written in the N binary image data memory means, respectively, and a second binary image data reading mode for selectively sequentially reading out the binary image data written in the M (M is an integer of 1≦M<N) binary image data memory means among the N binary image data memory means, respectively, and which allows the binary image data respectively written in the N binary image data memory means to be read out in accordance with either one of the first and second binary image data reading modes; and
  (D) binary image signal forming means for forming a binary image signal on the basis of the binary image data which are read out of the N binary image data memory means.

16. An apparatus according to claim 15, further having image pickup means for picking up an image of an object, for generating an image signal corresponding to the picked-up object image, and for supplying to the binary image data forming means.

17. An apparatus according to claim 15, further having display means for displaying an image corresponding to the binary image signal which is formed by the binary image signal forming means.

18. An apparatus according to claim 15, wherein the binary image data writing/reading control means has a first binary image data reading mode for sequentially distributing and writing the binary image data formed by the binary image data forming means into said plurality of binary image data memory means at different timings and for selectively sequentially switching and reading out the binary image data written in the N binary image data memory means, respectively, and a second binary image data reading mode for selectively sequentially switching and reading the binary image data written in the M binary image data memory means among the N binary image data memory means, respectively, and is arranged so as to allow the binary image data written in the N binary image data memory means to be read out in accordance with either one of the first and second binary image data reading modes.

19. An apparatus according to claim 15, wherein the binary image signal forming means includes interpolation processing means for executing an interpolating process to the binary image data which are read out of the M binary image data memory means in the case where the binary image data written in the M binary image data memory means are selectively sequentially read out in accordance with the second binary image data reading mode by the binary image data writing/reading control means.

* * * * *

UNITED STATES PATENT AND TRADEMARK OFFICE
CERTIFICATE OF CORRECTION

PATENT NO. : 5,315,408
DATED : May 24, 1994
INVENTOR(S) : NORIHIRO KAWAHARA, ET AL.

It is certified that error appears in the above-identified patent and that said Letters Patent is hereby corrected as shown below:

COLUMN 4

Line 55, "HIGH:" should read --HIGH--.

COLUMN 5

Line 41, "that" should read --that of--.

COLUMN 7

Line 57, "date" should read --data--.

Signed and Sealed this

Seventh Day of March, 1995

Attest:

BRUCE LEHMAN

Attesting Officer　　　Commissioner of Patents and Trademarks